(12) United States Patent
Shigei (10) Patent No.: US 8,204,030 B2
(45) Date of Patent: Jun. 19, 2012

(54) COMMUNICATION METHOD AND COMMUNICATION TERMINAL DEVICE

(75) Inventor: Hiroyuki Shigei, Tokyo (JP)

(73) Assignee: Sony Corporation, Tokyo (JP)

( * ) Notice: Subject to any disclaimer, the term of this patent is extended or adjusted under 35 U.S.C. 154(b) by 386 days.

(21) Appl. No.: 12/491,610

(22) Filed: Jun. 25, 2009

(65) Prior Publication Data

US 2010/0020778 A1     Jan. 28, 2010

(30) Foreign Application Priority Data

Jul. 28, 2008   (JP) ................................ 2008-193817

(51) Int. Cl.
*H04W 4/00* (2009.01)
(52) U.S. Cl. ....................................... 370/338; 370/400
(58) Field of Classification Search .......... 370/328–329, 370/335–336, 338, 341–343, 345, 441–442, 370/479–480, 400–401
See application file for complete search history.

(56) References Cited

U.S. PATENT DOCUMENTS

| | | | |
|---|---|---|---|
| 7,200,132 B2 * | 4/2007 | Twitchell, Jr. ................ | 370/338 |
| 7,623,499 B2 * | 11/2009 | Yahagi .......................... | 370/338 |
| 7,693,486 B2 * | 4/2010 | Kasslin et al. ................ | 455/41.2 |
| 7,778,603 B2 * | 8/2010 | Palin et al. .................... | 455/41.2 |
| 7,948,952 B2 * | 5/2011 | Hurtta et al. .................. | 370/338 |
| 7,990,912 B2 * | 8/2011 | Nix et al. ...................... | 370/328 |
| 2004/0246986 A1 * | 12/2004 | Belcea .......................... | 370/444 |
| 2005/0286540 A1 * | 12/2005 | Hurtta et al. .................. | 370/401 |
| 2006/0023679 A1 * | 2/2006 | Twitchell ...................... | 370/338 |
| 2006/0062191 A1 * | 3/2006 | Matsumoto .................... | 370/338 |
| 2008/0267114 A1 * | 10/2008 | Mukherjee et al. ............ | 370/315 |

FOREIGN PATENT DOCUMENTS

| | | |
|---|---|---|
| JP | 2003-249935 | 9/2003 |
| JP | 2005-6019 | 1/2005 |
| JP | 2005-20162 | 1/2005 |
| JP | 2006-35417 | 2/2006 |
| JP | 2006-270410 | 10/2006 |
| JP | 2008-35417 | 2/2008 |

* cited by examiner

*Primary Examiner* — Chi H. Pham
*Assistant Examiner* — Kevin Mew
(74) *Attorney, Agent, or Firm* — Oblon, Spivak, McClelland, Maier & Neustadt, L.L.P.

(57) ABSTRACT

A communication method includes the steps of: establishing a session with one or two or more other communication terminals according to a set content before it is changed in a case where a change request for own set information about a radio communication is received; notifying a set content to be changed to the one or two or more other communication terminals with which the session is established; and changing the own set information from the set content before it is changed to the set content to be changed.

4 Claims, 7 Drawing Sheets

FIG.2

FIG.3 CONFIGURATION OF OPTICAL DISC DEVICE

FIG.4

CONFIGURATION OF ACCESS POINT

FIG.5

CONFIGURATION OF RADIO COMMUNICATION TERMINAL

FIG.6

LAN SET INFORMATION CHANGE PROCESSING

DIFFERENCE WHEN CHANGING LAN SET INFORMATION BY METHOD ACCORDING TO EMBODIMENT OF THE PRESENT INVENTION AND METHOD IN RELATED ART

COMMUNICATION METHOD AND COMMUNICATION TERMINAL DEVICE

BACKGROUND OF THE INVENTION

1. Field of the Invention

The present invention relates to a communication method and a communication terminal device suitably used, for example, in a radio communication field.

2. Description of Related Art

Recently, types of home appliances that come with a radio communication capability tend to increase and familiar home appliances, for example, TV devices and record and reproduction devices, come with this capability.

In a case where a new terminal is added to a wireless LAN communication system, a technique of automatically setting this newly added terminal is disclosed, for example, in JP-A-2008-131429.

SUMMARY OF THE INVENTION

However, besides a case where a new terminal is added to the wireless LAN communication system, there is a case where the user wishes to change the setting by himself. In such a case, it is necessary to set each communication terminal constituting the LAN individually and the procedure becomes more complex as the number of the communication terminals constituting the wireless LAN increases. Meanwhile, when all the communication terminals constituting the LAN are set at a time, it is necessary to secure another communication line for each terminal. The procedure becomes complex in this case, too.

Thus, it is therefore desirable to provide a communication method and a communication terminal device capable of changing the set content with ease.

According to an embodiment of the present invention, there is provided a communication method including the steps of: establishing a session with one or two or more other communication terminals according to a set content before it is changed in a case where a change request for own set information about a radio communication is received; notifying a set content to be changed to the one or two or more other communication terminals with which the session is established; and changing the own set information from the set content before it is changed to the set content to be changed.

According to another embodiment of the present invention, there is provided a communication terminal device including: a memory that stores set information about a radio communication; a radio communication processing portion; and a control portion that controls the radio communication processing portion and the memory. The control portion establishes a session with one or two or more other communication terminals according to a set content before it is changed in a case where a change request for the set information is received and after a set content to be changed is notified to the one or two or more other communication terminals with which the session is established, changes the set information from the set content before it is changed to the set content to be changed.

According to the embodiments of the invention, a session to be established during normal data communications is used to notify the set content to be changed. Hence, by merely inputting the change content, it becomes possible to change not only the own set information but also the set information in the communication terminals other than the self that are wirelessly connectable with the set information before it is changed, at the same time without having to forcedly secure a new communication channel. A communication method and a communication terminal device capable of changing the set content with ease can be thus achieved.

DESCRIPTION OF THE PREFERRED EMBODIMENTS

Hereinafter, embodiments of the present invention will be described with reference to the drawings.

(1) Overall Configuration of Communication System According to Embodiment

Figure 1:
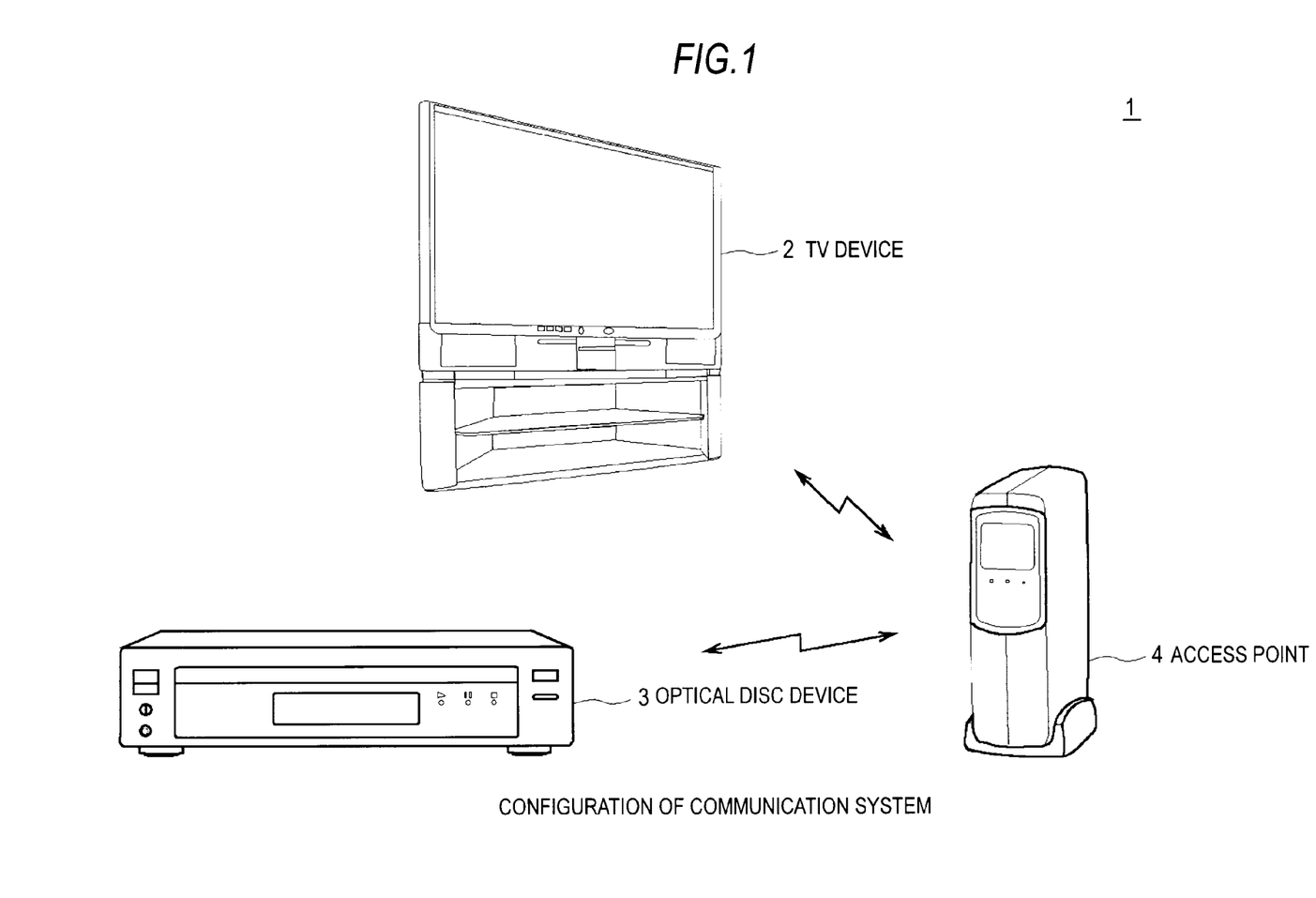
FIG. 1 is a diagram schematically showing the configuration of a communication system.

FIG. 1 shows the overall configuration of a communication system 1 according to an embodiment of the present invention. The communication system 1 includes a TV device 2, an optical disc device 3, and an access point 4 that are connectable, for example, via the LAN (Local Area Network).

(2) Configuration of TV Set

Figure 2:
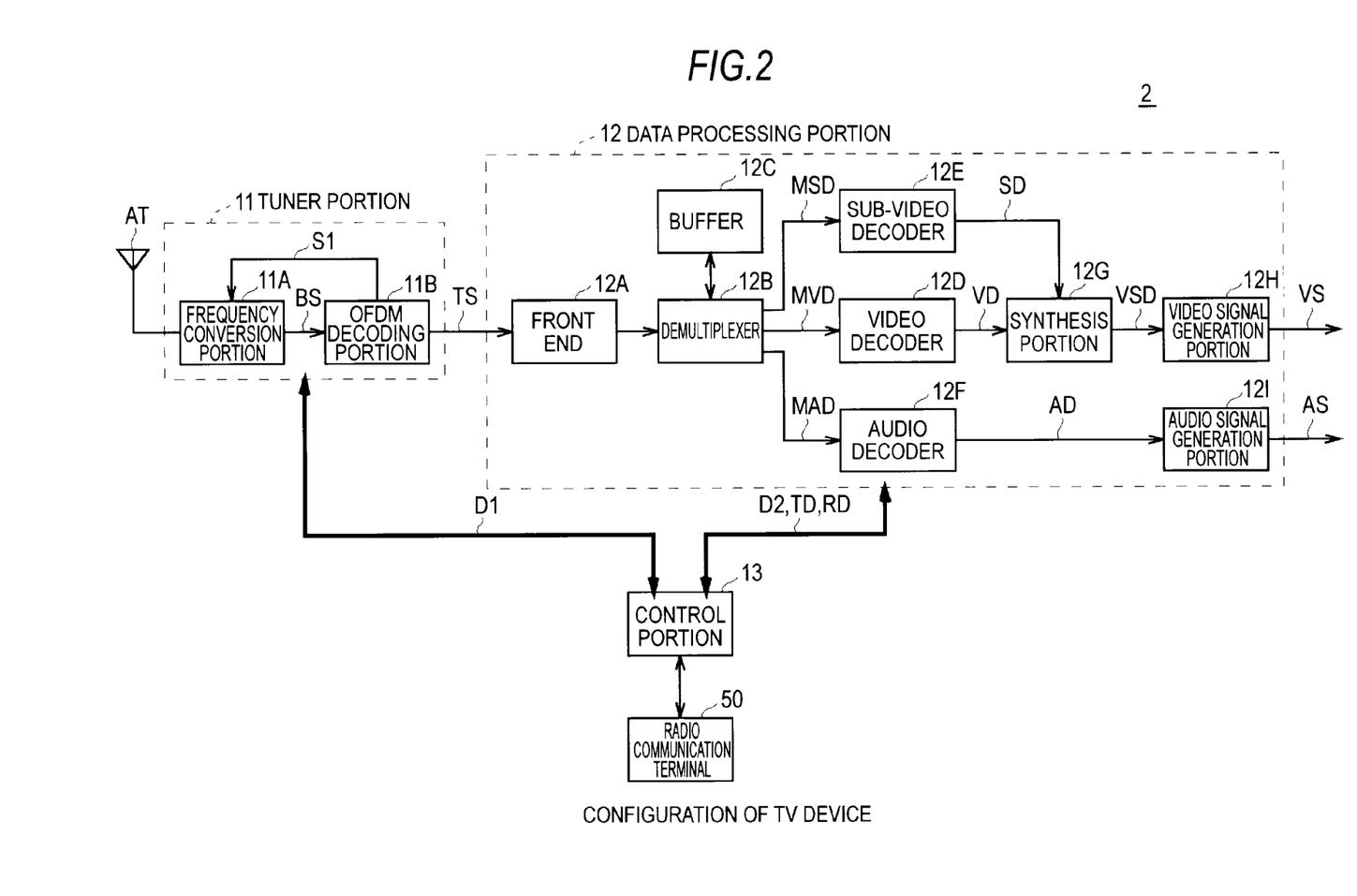
FIG. 2 is a block diagram showing the configuration of a TV device.

The configuration of the TV device 2 will now be described using FIG. 2. The TV device 2 includes a tuner portion 11, a data processing portion 12, and a control portion 13 that controls the tuner portion 11 and the data processing portion 12.

A plurality of digital broadcast waves transmitted from the base station within the broadcast area are supplied to the tuner portion 11 via an antenna AT and frequency specifying data specifying a carrier frequency is also given from the control portion 13.

A frequency conversion portion 11A in the tuner portion 11 selects a digital broadcast wave BS at the carrier frequency specified by frequency specifying data D1 from a plurality of digital broadcast waves supplied from the antenna AT, and sends the digital broadcast wave BS to an OFDM (Orthogonal Frequency Division Multiplexing) decoding portion 11B. In this instance, the frequency conversion portion 11A tunes an output of the digital broadcast wave BS to a constant level according to an AGC (Auto Gain Control) signal S1 fed back from the OFDM decoding portion 11B.

The OFDM decoding portion 11B feeds back a difference between a signal level of the digital broadcast wave BS sent from the frequency conversion portion 11A and a predetermined signal level to the frequency conversion portion 11A in the form of the AGC signal S1. In addition, the OFDM decoding portion 11B applies OFDM decoding processing on the digital broadcast wave BS to restore an MPEG2 (Moving Picture Experts Group Layer-2) transport stream (hereinafter, referred to simply as the transport stream) TS imposed on the digital broadcast wave BS, and sends the restored transport stream to a front end 12A of the data processing portion 12.

The front end 12A applies various types of preprocessing, such as error correction and descrambling, on the transport stream TS sent from the tuner portion 11, and sends the preprocessed transport stream TS to a demultiplexer 12B.

The transport stream TS supplied from the front end 12A and program specifying data D2 supplied from the control portion 13 are inputted into the demultiplexer 12B. The demultiplexer 12B temporarily stores the transport stream TS into a buffer 12C and reads out the temporarily stored transport stream TS from the buffer 12C per predetermined unit in an arbitrary order.

The demultiplexer 12B isolates MPEG video data MVD corresponding to a broadcast program name specified by the program specifying data D2, MPEG sub-data MSD made up of a telop and the like, and MPEG audio data MAD from data of a plurality of broadcast programs superimposed on the transport stream TS, which are sent to a video decoder 12D, a sub-video decoder 12E, and an audio decoder 12F, respectively.

The video decoder 12D applies predetermined decompression processing in conformity with the MPEG compression coding on the MPEG video data MVD and sends the resulting video data VD to a synthesis portion 12G. The sub-video decoder 12E applies predetermined decompression processing in conformity with the MPEG compression coding on the MPEG sub-data MSD and sends the resulting sub-data SD to the synthesis portion 12G.

The synthesis region 12G superimposes the sub-data SD on the video data VD and sends the synthesized video data (hereinafter, referred to as the synthesis video data) VSD to a video signal generation portion 12H.

The video signal generation portion 12H applies A/D (Analog/Digital) processing on the synthesis video data VSD, after which it applies predetermined format conversion processing in conformity with the TV system, for example, PAL (Phase Alternation by Line) or NTSC (National Television System Committee). The video signal generation portion 12H then outputs a video signal VS obtained as the result of the format conversion processing to a display portion (not shown).

Meanwhile, the audio decoder 12F applies predetermined decompression processing in conformity with the MPEG compression coding on the MPEG audio data MAD and sends the resulting audio data AD to an audio signal generation portion 12I. The audio signal generation portion 12I applies A/D processing on the audio data AD and outputs the resulting audio signal AS to a speaker (not shown).

As has been described, the TV device 2 is configured in such a manner that it enables the user to view a certain broadcast program.

In addition to the above configuration, a radio communication terminal 50 is connected to the control portion 13 in the TV device 2. The transport stream TS, the MPEG video data MVD, the MPEG sub-data MSD, or the MPEG audio data MAD is given to the radio communication terminal 50 from the demultiplexer 12B as transmission data TD when the necessity arises under the control of the control portion 13.

The radio communication terminal 50 transmits the transmission data TD to the optical disc device 3 or the access point 4. Meanwhile, in a case where the radio communication terminal 50 receives data transmitted from the optical disc device 3 or the access portion 4, it supplies the received data RD to the demultiplexer 12B under the control of the control portion 13.

Hence, the TV device 2 is configured in such a manner that it enables the user to view contents reproduced by the optical disc device 3 and various contents registered in a server on the Internet via the access point 4 and records data about a desired broadcast program in an optical disc.

(3) Configuration of Optical Disc Device

Figure 3:
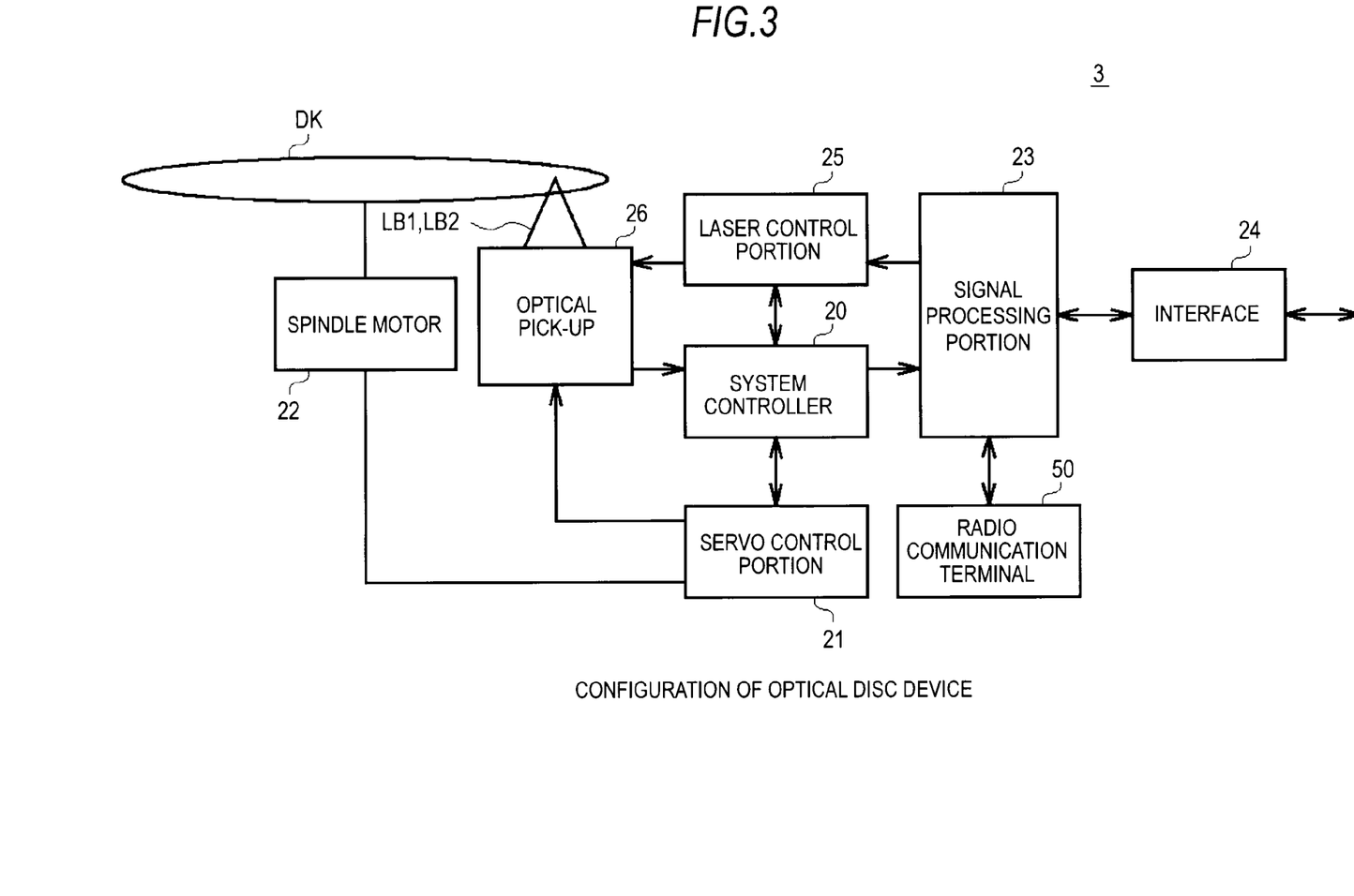
FIG. 3 is a block diagram showing the configuration of an optical disc device.

The configuration of the optical disc device 3 will now be described using FIG. 3. The optical disc device 3 has a record mode to record data in an optical disc DK, such as a DVD (Digital Versatile Disc), a CD (Compact Disc), and a BD (Blu-ray Disc), and a reproduction mode to reproduce data recorded in the optical disc DK.

In the case of the record mode, a system controller 20 rotationally drives the optical disc DK loaded in the optical disc device 3 by driving a spindle motor 22 via a servo control portion 21 under its control.

A signal processing portion 23 applies predetermined signal processing, such as modulation processing, on the record data supplied via an interface 24 and applies the resulting record data to a laser control portion 25 as laser drive data.

The laser control portion 25 drives a laser diode (not shown) provided inside an optical pick-up 26 to blink at constant power according to the laser drive data supplied therein. In response to blinking of the laser diode, a light beam LB1 is irradiated to blink toward the optical disc DK from the optical pick-up 26. A record content is thus recorded in the optical disc DK.

In this instance, a signal generated according to a reflection beam LB2 reflected on the optical disc DK is given from a light receiving element (not shown) provided inside the optical pick-up 26 to the system controller 20.

On the basis of this signal, the system controller 20 generates a focus error signal and a tracking error signal. The system controller 20 is configured in such a manner that it controls the optical pick-up 26 via the servo control portion 21 for the light beam LB1 emitted from the optical pick-up 26 to achieve a just focus state and a just tracking state on the information recording surface of the optical disc DK according to the focus error signal and the tracking error signal.

Meanwhile, in the case of the reproduction mode, as in the record mode, the system controller 20 rotationally drives the optical disc DK loaded in the optical disc device 3 by driving the spindle motor 22 via the servo control portion 21 under its control.

In addition, the system controller 20 lights on the laser diode (not shown) inside the optical pick-up 26 at constant power via the laser control portion 25. Accordingly, the light beam LB1 is continuously irradiated from the optical pick-up 26 toward the optical disc DK, and the signal outputted from the light receiving element (not shown) according to the reflection light beam LB2, which is the light beam LB1 reflected on the optical disc DK, is given to the system controller 20.

As in the record mode, on the basis of this signal, the system controller 20 generates a focus error signal, a tracking error signal, and an RF signal and performs the focus control and the tracking control in the same manner as in the record mode according to these focus error signal and tracking error signal while it sends the RF signal to the signal processing portion 23. The signal processing portion 23 applies predetermined signal processing, such as decoding processing and error correction processing, on the RF signal supplied therein and sends the resulting reproduction data to the interface 24.

As has been described, the optical disc device 3 is configured in such a manner that it records data in the optical disc DK and reproduces data recoded in the optical disc DK.

In addition to this configuration, the radio communication terminal 50 is connected to the signal processing portion 23 in the optical disc device 3. Reproduction data is given from the signal processing portion 23 to the radio communication terminal 50 when the necessity arises under the control of the system controller 20.

The radio communication terminal 50 transmits the reproduction data to the TV device 2 or the access portion 4 as the transmission data. Meanwhile, in a case where the radio communication terminal 50 receives data transmitted from the TV device 2 or the access portion 4, it gives this data to the signal processing portion 23. This data is recorded in the optical disc DK via the laser control portion 25 as the record data.

Accordingly, the optical disc device 3 is configured in such a manner that it records a broadcast program received at the TV device 2 or various contents registered in a server on the Internet via the access point 4 into the optical disc DK and enables the user to view the data recorded in the optical disc DK on the TV device 2.

(4) Configuration of Access Point

Figure 5:
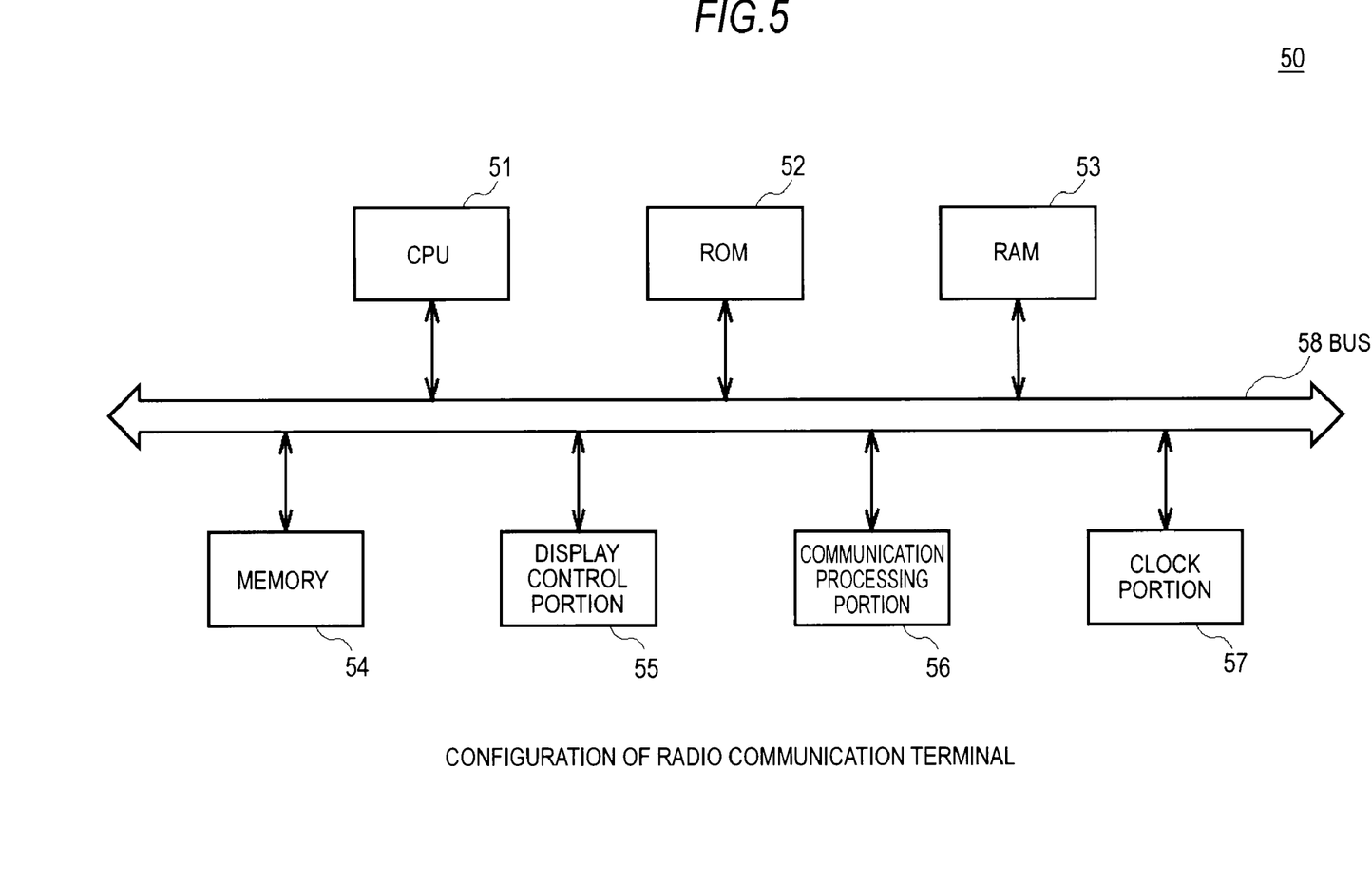
FIG. 5 is a block diagram showing the configuration of a radio communication terminal.

The configuration of the access point 4 will now be described using FIG. 5. The access point 4 includes a network communication processing portion 32, a network interface 33, a display portion 34, and the radio communication terminal 50, all of which are connected to a control portion 31.

In a case where data transmitted from the TV device 2 or the optical disc device 3 is given to the control portion 31 from the radio communication terminal 50, it sends this data to a server on the Internet via the network interface 33 as data in conformity with TCP (Transmission Control Protocol)/IP (Internet Protocol) using the network communication processing portion 32. The control portion 31 displays a processing status of the network communication portion 32 on the display portion 34 when the necessity arises.

Meanwhile, in a case where data is given to the control portion 31 from the network interface 32 via the Internet, the control portion 31 sends this data to the radio communication terminal 50. In this case, the radio communication terminal 50 transmits the data thus given to the TV device 2 or the optical disc device 3 as the transmission data. Also, the radio communication terminal 50 is configured so as so function as a radio relay that connects the TV device 2 and the optical disc device 3.

As has been described, the access point 4 is configured in such a manner that it relays transmission and reception of data among the Internet, the TV device 2, and the optical disc device 3.

(5) Configuration of Radio Communication Terminal

Figure 4:
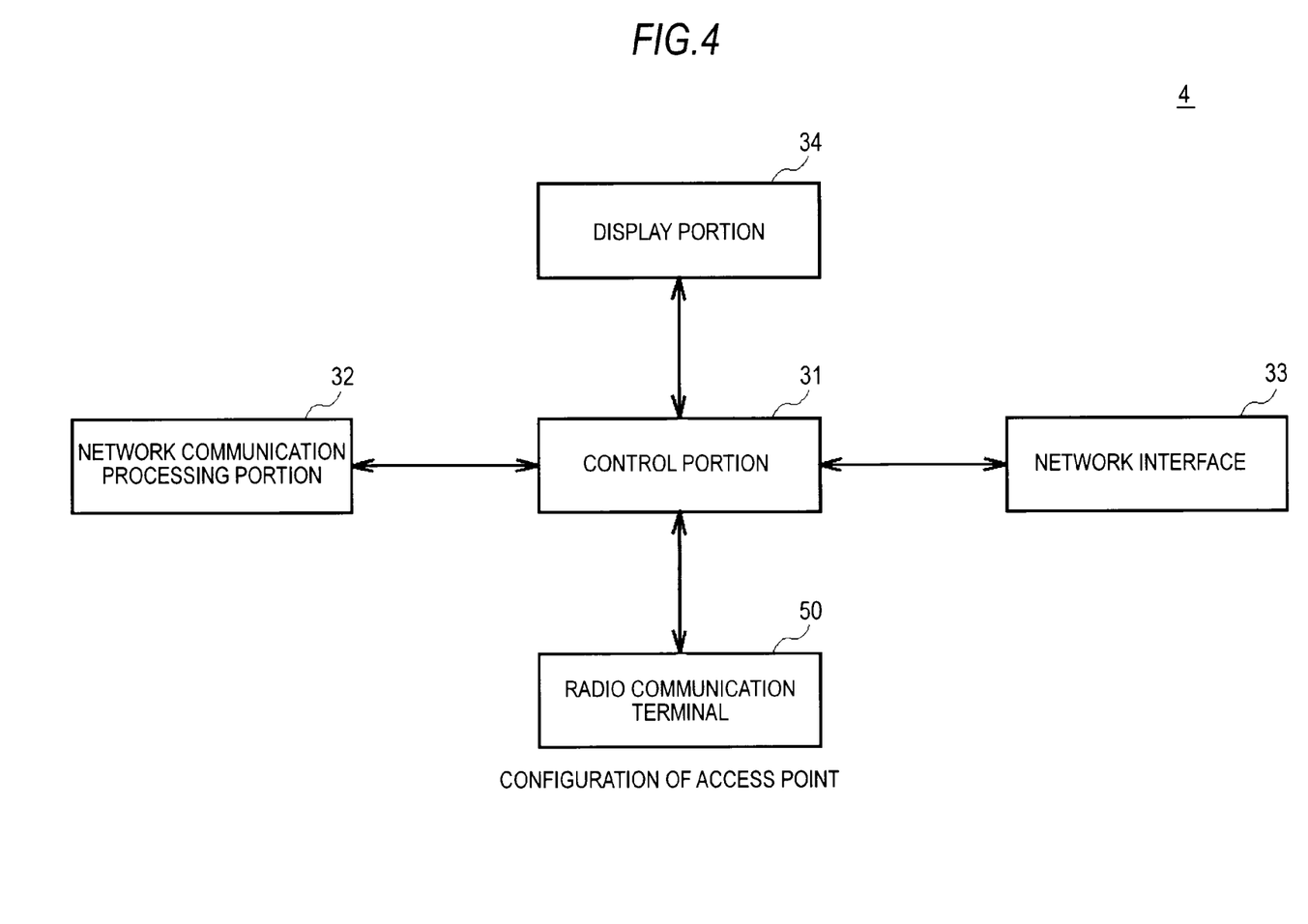
FIG. 4 is a block diagram showing the configuration of an access point.

The configuration of the radio communication terminal 50 will now be described using FIG. 4. The radio communication terminal 50 has a ROM (Read Only Memory) 52 in which a plurality of programs are stored, a RAM (Random Access Memory) 53, a memory 54, a display control portion 55, a LAN communication processing portion 56, and a clock portion 57, all of which are connected to a CPU (Central Processing Unit) 51 via a bus 58.

The memory 54 stores set information about the wireless LAN (hereinafter, referred to as the LAN set information), such as encryption parameters necessary for encryption methods, for example, an SSID (Service Set IDentifier), an IP (Internet Protocol) address, and WEP (Wired Equivalent Privacy).

In a case where an instruction is given to the CPU 51 from an operation portion provided to an electronic device, the CPU 51 develops the program corresponding to the instruction in the PAM 52 and executes various types of processing according to the developed program by controlling the memory 54, the display control portion 55, the LAN communication portion 56, or the clock portion 57 when the necessity arises.

For instance, in a case where an instruction to communicate with a specified terminal is given, the CPU 51 executes processing to make a communication by encrypting data subject to communication using the LAN set information stored in the memory 54 and the LAN communication processing portion 56.

Also, for instance, in a case where an instruction to change the LAN set information is given, the CPU 51 makes the display portion of the electronic device that comes with the radio communication terminal 50 display the set screen of the LAN set information together with the content of the current LAN set information using the LAN set information stored in the memory 54 and the display control portion 55.

In a case where the content of the LAN set information is changed through the set screen, the CPU 51 executes processing to change the LAN set information in the self and in other electronic devices that together constitute the wireless LAN (hereinafter, referred to also as the LAN set information change processing) using the LAN set information to be changed, the current LAN set information, and the LAN communication processing portion 56.

(6) LAN Set Information Change Processing

Figure 6:
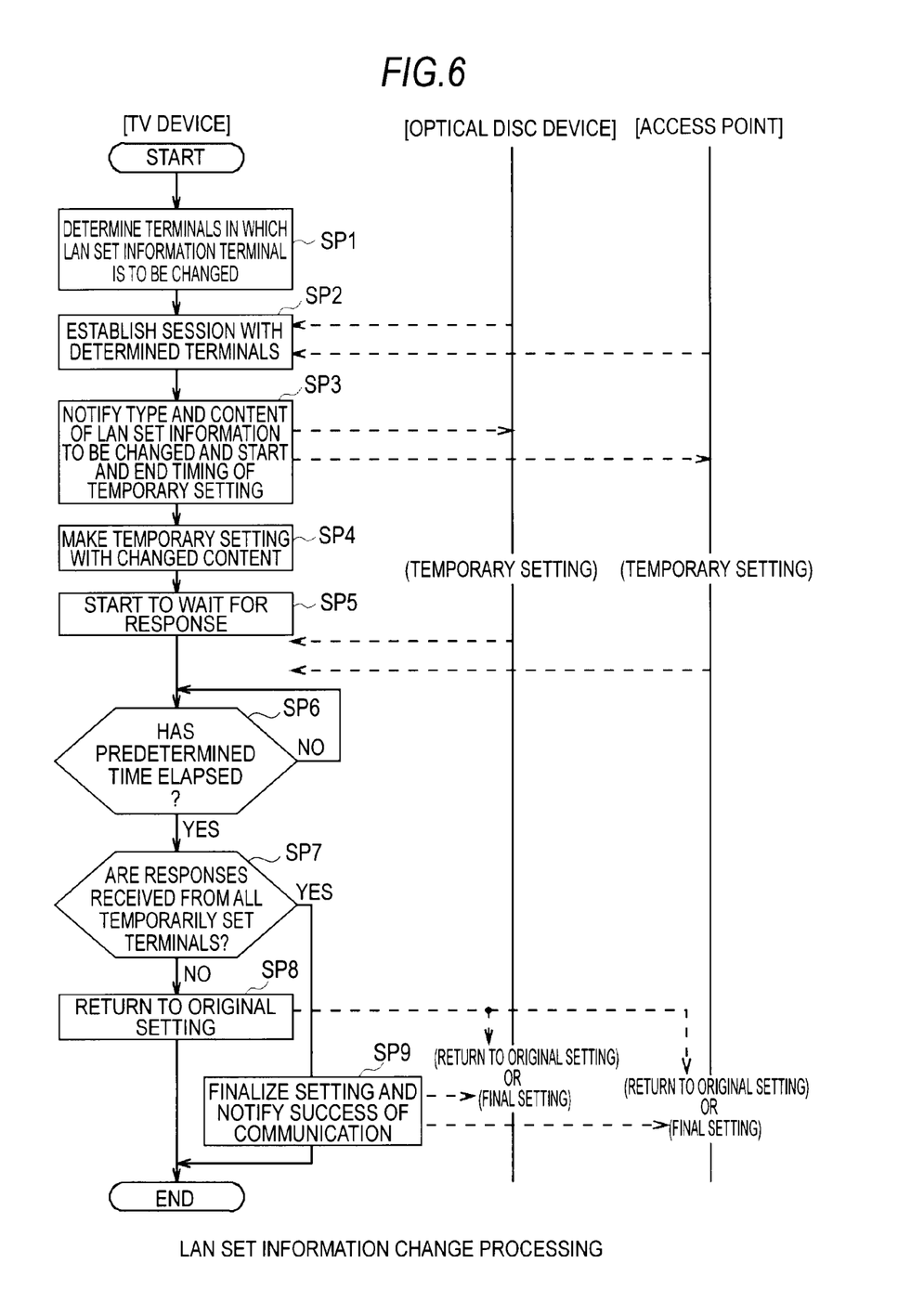
FIG. 6 is a flowchart depicting the procedure of LAN set information change processing.

The LAN set information change processing will now be described using FIG. 6. FIG. 6 shows an example in a case where the LAN set information held in the TV device 2, the optical disc device 3, and the access point 4 is reset to a content changed in the TV device 2 chiefly by the radio communication terminal 50 in the TV device 2.

In other words, in a case where the LAN set information is changed through the reset screen, the CPU 51 starts the LAN set information change processing and proceeds to Step SP1, in which it determines the radio communication terminals 50 in which the LAN set information is to be changed on the basis of the type and the content of the LAN set information that has been changed.

For example, in a case where the setting of the SSID of the access point 4 and the TV device 2 and the optical disc device 3 related to the original access point 4 is changed on the reset screen, the radio communication terminals 50 in the self (TV device 2), the optical disc device 3, and the access point 4 are determined as the radio communication terminals in which the LAN set information is to be changed.

In Step SP2, the CPU 51 verifies the radio communication terminals 50, for example, in the optical disc device 3 and the access point 4 determined in Step SP1, using the communication processing portion 16 when the necessity arises. Also, the CPU 51 establishes a session, for example, with the radio communication terminals 50 in the optical disc device 3 and the access point 4 determined in Step SP1 according to the content of the current LAN set information stored in the memory 54.

Subsequently, the CPU 51 proceeds to Step SP3 and transmits a control message specifying the type and the content of the LAN set information to be changed and start timing and end timing of temporary setting to the radio communication terminals 50 with which the session is established in Step SP2.

The start timing of temporary setting is, for example, a time point when m (sec) has elapsed since the time point of reception of the control message. Also, the end timing of temporary setting is a time point when n (sec) has elapsed since the time point of transmission of a response message informing the making of temporary setting.

In a case where the radio communication terminal 50 in the optical disc device 3 or the access point 4 receives the control message, its own LAN set information is replaced (temporarily set) with the change content without discarding the current content at a time point when m (sec) has elapsed since the time point of reception.

The response message informing the making of temporary setting is transmitted to the radio communication terminal 50 in the TV device 2 and a notice message requesting to finalize the setting is waited for until n (sec) has elapsed since the time point of transmission.

Meanwhile, after the CPU 51 transmits the control message, it proceeds to the following step SP4 and replaces its own LAN set information (temporarily sets) with the change content without discarding the current content. The CPU 51 then proceeds to Step SP5 to start to wait for the response message from the transmitter of the control message while measuring the waiting time using the clock portion 57 and proceeds to the following Step SP6.

In Step SP6, in a case where the CPU 51 determines that a predetermined period has elapsed since the waiting is started, it proceeds to Step SP7 to determine the absence or presence of the response messages from all the radio communication terminals 50 in which the LAN set information has been changed.

Herein, a case where the response messages are not received from all the radio communication terminals 50 in which the LAN set information has been changed before the predetermined period has elapsed means the presence of a radio communication terminal that failed to make communications with the changed LAN set information. To be more concrete, it may be a case where the communication band is changed and the changed communication band is within the band that enables communications with one terminal but outside the band that enables communication with another terminal.

In this case, the CPU 51 proceeds to Step SP8 and returns the LAN set information set temporarily in Step SP4 to the original content, after which it ends the procedure of the LAN set information change processing.

Accordingly, the notice message requesting to finalize the setting will not be notified to the radio communication terminal 50 in the optical disc device 3 or the access point 4. In this case, in the radio communication terminal 50 in the optical disc device 3 or the access point 4, the LAN set information is returned to the original content at a time point when the end timing of the temporary setting has elapsed since the time point of transmission of the response message. Consequently, the original construction state of the wireless LAN is maintained in the communication system 1.

On the contrary, a case where the response messages are received from all the radio communication terminals 50 in which the LAN set information has been changed before the predetermined period has elapsed means that all the radio communication terminals subject to change succeeded in making communications with the changed LAN set information.

In this case, the CPU 51 proceeds to Step SP9 to maintain the set content in the LAN set information while discarding (finalizing the setting) of the set content before it is changed, and transmits the notice message requesting to finalize the setting to the radio communication terminals 50 to which the control message was sent in Step SP3, after which it ends the procedure of the LAN set information change processing.

The notice message is delivered to the radio communication terminal 50 in the optical disc device 3 or the access point 4 before the end timing of the temporary setting has elapsed since the time point of transmission of the response message. Hence, in the radio communication terminal 50 in the optical disc device 3 or the access point 4, the set content before it is changed is discarded (the setting is finalized) while the set content in the LAN set information is maintained even after the end timing of the temporary setting has elapsed. Consequently, the wireless LAN is constructed according to the changed LAN set information in the communication system 1.

(7) Operation and Effect

With the configuration described above, in the communication system 1, the radio communication terminal 50 in the TV device 2 that received a change request for the set information establishes a session with the radio communication terminals 50 in the optical disc device 3 and the access point 4 that constitute the wireless LAN according to the LAN set content before it is changed and notifies the LAN set content to be changed.

The radio communication terminals 50 in the TV device 2, the optical disc device 3, and the access point 4 change (temporarily set) the LAN set information from the set content before it is changed to the set content to be changed.

Figure 7A:
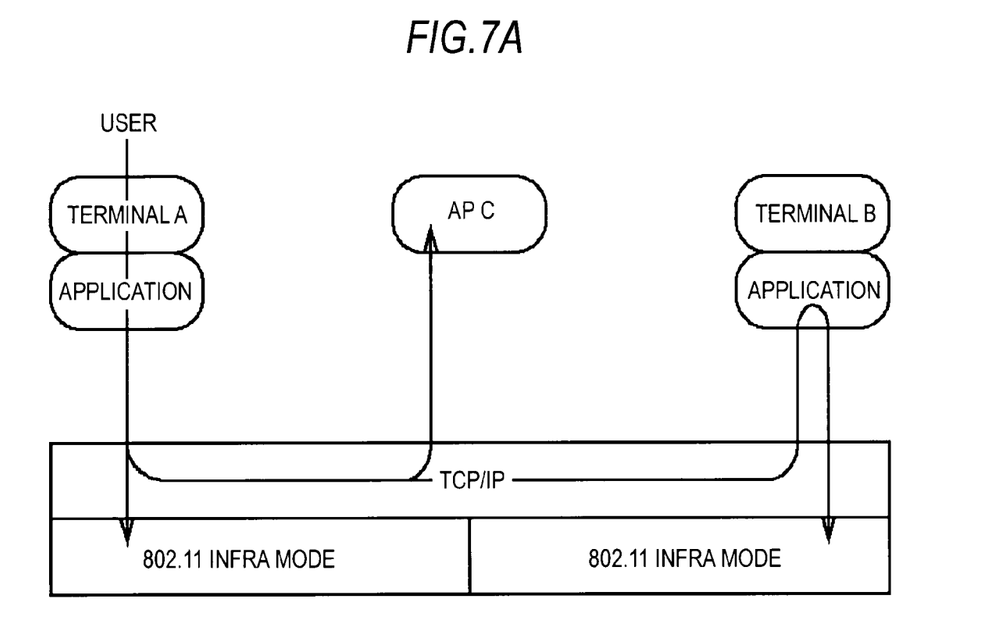
FIG. 7A and FIG. 7B are diagrams used to describe a difference when LAN set information is changed by the method according to an embodiment of the present invention and the method in the related art.
Figure 7B:
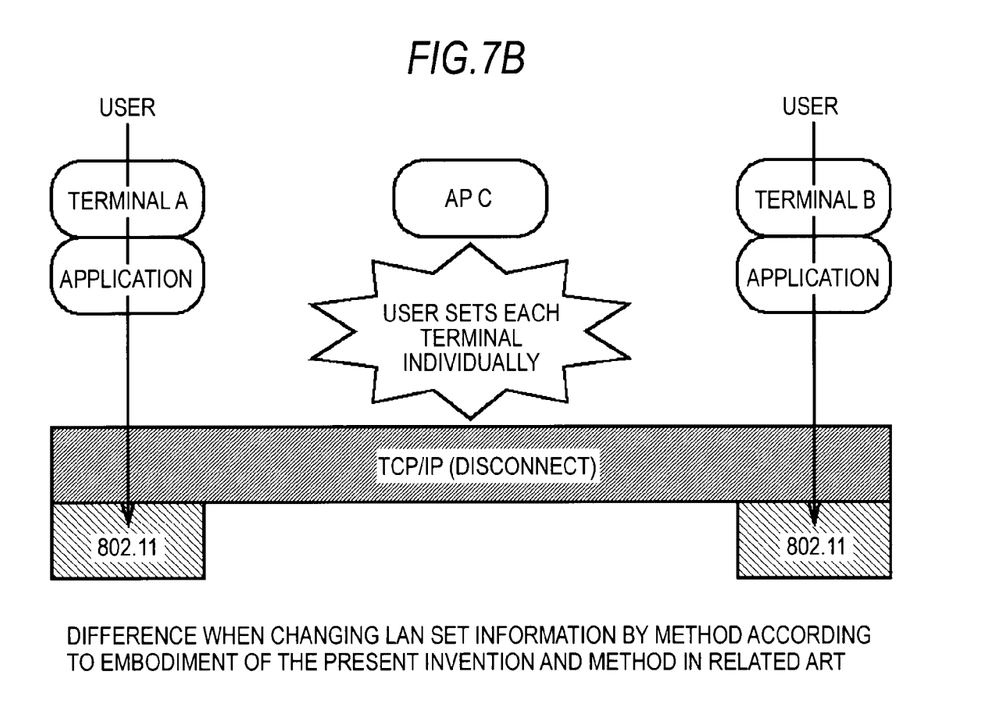

In other words, in the communication system 1, as is shown in FIGS. 7A and 7B, a communication channel of the TCP/IP base to be established during normal data communications is used as a channel for notifying the LAN set content to be changed (FIG. 7A). By contrast, the user by himself changes the set content of each radio communication terminal individually in the related art (FIG. 7B).

Hence, in the communication system 1, by merely inputting the change content using any one of electronic devices (the TV device 2 in the case described above) constituting the LAN, a change for the change content is made not only in the electronic device used (the TV device 2) but also in all the other electronic devices (the optical disc device 3 and the access point 4) at the same time without having to forcedly secure a new communication channel.

In the communication system 1, the radio communication terminal 50 in the TV device 2 that received the change request notifies not only the LAN set content to be changed, but also the change timing of the LAN set content and the condition under which the LAN set content that was once changed is returned to the original.

In other words, the radio communication terminal 50 in the TV device 2 functioning as the master controls the change of the LAN set content and the returning to the original LAN set content for the radio communication terminals constituting the LAN.

Hence, even when the radio communication terminal constituting the LAN is an existing terminal, in the communication system 1, it is possible to change the LAN set content and to return the changed LAN set content to the original LAN set content when communications are not made using the changed LAN set content.

According to the configuration described above, it is possible to achieve the communication system 1 capable of changing the set content with ease by merely inputting the change content using any one of the electronic devices constituting the LAN owing to the capability of changing the set information to the change content not only in the electronic device used but also in all the other electronic devices at the same time without having to forcedly secure a new communication channel.

(8) Other Embodiments

In the embodiment above, in a case (Step SP7) where the response messages are not received from all the radio communication terminals 50 in which the LAN set information has been changed before the predetermined period has elapsed, the LAN set content is returned to the original for the radio communication terminals 50. It is possible to modify this configuration.

To be more concrete, when a ratio of the radio communication terminals 50 from which the response messages are not received becomes as large as or larger than a predetermined threshold value, the LAN set content is returned to the original in all the radio communication terminals 50. Meanwhile, when a ratio of the radio communication terminals 50 from which the response messages are not received is smaller than the predetermined threshold value, it may be configured in such a manner that a notice message requesting to finalize the setting is transmitted to the radio communication terminals 50 from which the response messages were received while the radio communication terminals 50 from which the response messages were not received are presented to the display portion.

When configured in this manner, in a case where there are fewer radio communication terminals 50 that fail to make radio communications with the changed set content, it becomes possible to set these radio communication terminals 50 individually while automatically setting the other radio communication terminals 50.

The embodiments above described a case where the LAN set content is changed in the infrastructure mode. It should be appreciated, however, that the LAN set content can be changed in the same manner as the embodiment above even when the ad hoc mode is changed to the infrastructure mode.

In the embodiments above, the TV device 2, the optical disc device 3, or the access point 4 is used as the electronic device that comes with the communication terminal device (radio communication terminal 50). It should be appreciated, however, that the electronic device is not limited to the examples specified in the embodiment above. For example, the present invention is applicable to a broader range of devices including a personal computer, a PDA (Personal Digital Assistant), a mobile phone, and home appliances.

The embodiments above employ the wireless LAN. It should be appreciated, however, that other radio communications, for example, IEEE (Institute of Electrical and Electronics Engineers) 1394 and Bluetooth, are also applicable.

Embodiments of the invention can be used, for example, as a terminal that transmits and receives information by radio communications.

The present application contains subject matter related to that disclosed in Japanese Priority Patent Application JP 2008-193817 filed in the Japan Patent Office on Jul. 28, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication method performed by a communication terminal device, the method comprising:

establishing, by a control portion of the communication terminal device, a session with one or two or more other communication terminals according to a set content stored in a memory of the communication terminal device before it is changed in a case where a change request for own set information about a radio communication is received;

notifying, by a radio communication processing portion of the communication terminal device, a set content to be changed to the one or two or more other communication terminals with which the session is established;

changing, by the control portion, the own set information from the set content before it is changed to the set content to be changed;

returning, by the control portion, the own set information to the set content before it is changed in a case where a response is not received from at least one of all other communication terminals notified in the notifying before a predetermined period has elapsed since the changing; and transmitting, by the radio communication processing portion, a message informing a success of a radio communication to all the other communication terminals in a case where responses are received from all the other communication terminals notified in the notifying before the predetermined time has elapsed since the changing, wherein the set content to be changed and change timing thereof, and a waiting period for the message since the change timing has elapsed for returning the set information to the set content before it is changed in a case where the message is not received within the period, are notified in the notifying.

2. A communication method performed by a communication terminal device, the method comprising:

establishing, by a control portion of the communication terminal device, a session with one or two or more other communication terminals according to a set content stored in a memory of the communication terminal device before it is changed in a case where a change request for own set information about a radio communication is received;

notifying, by a radio communication processing portion of the communication terminal device, a set content to be changed to the one or two or more other communication terminals with which the session is established;

changing, by the control portion, the own set information from the set content before it is changed to the set content to be changed;

transmitting, by the radio communication processing portion in a case where a ratio of communication terminals from which responses are not received before the predetermined time has elapsed since the changing with respect to all the other communication terminals notified in the notifying is smaller than a threshold value, a message informing a success of a radio communication to the other communication terminals from which the responses are received, and presenting the other communication terminals from which the responses are not received or corresponding electronic devices to a user.

3. A communication terminal device comprising:

a memory that stores set information about a radio communication;

a radio communication processing portion; and a control portion that controls the radio communication processing portion and the memory, wherein the control portion establishes a session with one or two or more other communication terminals according to a set content before it is changed in a case where a change request for the set information is received and after a set content to be changed is notified to the one or two or more other communication terminals with which the session is established, changes the set information from the set content before it is changed to the set content to be changed, the control portion returns the own set information to the set content before it is changed in a case where a response is not received from at least one of all other notified communication terminals before a predetermined period has elapsed since changing the set information, the radio communication processing portion transmits a message informing a success of a radio communication to all the other communication terminals in a case where responses are received from all the other notified communication terminals before the predetermined time has elapsed since changing the set information, and the set content to be changed and change timing thereof, and a waiting period for the message since the change timing has elapsed for returning the set information to the set content before it is changed in a case where the message is not received within the period, are notified in the notifying to the one or two or more other communication terminals.

4. A communication terminal device comprising:

a memory that stores set information about a radio communication;

a radio communication processing portion; and a control portion that controls the radio communication processing portion and the memory, wherein the control portion establishes a session with one or two or more other communication terminals according to a set content before it is changed in a case where a change request for the set information is received and after a set content to be changed is notified to the one or two or more other communication terminals with which the session is established, changes the set information from the set content before it is changed to the set content to be changed, and the radio communication processing portion transmits, in a case where a ratio of communication terminals from which responses are not received before the predetermined time has elapsed since changing the set information with respect to all the other notified communication terminals is smaller than a threshold value, a message informing a success of a radio communication to the other communication terminals from which the responses are received, and presenting the other communication terminals from which the responses are not received or corresponding electronic devices to a user.

* * * * *